US006693259B2

(12) United States Patent
Moon et al.

(10) Patent No.: US 6,693,259 B2
(45) Date of Patent: Feb. 17, 2004

(54) SELF-DIAGNOSIS TYPE WELDING CARRIAGE CONTROL SYSTEM FOR AUTOMATICALLY CONTROLLING WELDING CONDITIONS AND IMPLEMENTING OSCILLATION MOTION

(75) Inventors: Hyung-Soon Moon, Ulsan-Si (KR);
Hyeoq-Jun Kwon, Ulsan-Si (KR);
Young-Jin Park, Ulsan-Si (KR);
Jong-Jun Kim, Ulsan-Si (KR);
Byung-Kyu Woo, Ulsan-Si (KR);
Yong-Baek Kim, Busan-Si (KR)

(73) Assignee: Hyndai Heavy Industries Co., Ltd., Ulsan-Si (KR)

( * ) Notice: Subject to any disclaimer, the term of this patent is extended or adjusted under 35 U.S.C. 154(b) by 9 days.

(21) Appl. No.: 10/199,088

(22) Filed: Jul. 22, 2002

(65) Prior Publication Data

US 2003/0042236 A1 Mar. 6, 2003

(30) Foreign Application Priority Data

Sep. 3, 2001 (KR) ......................... 2001/53817

(51) Int. Cl.[7] ................................ B23K 9/12
(52) U.S. Cl. ............... 219/125.12; 219/124.34
(58) Field of Search ............ 219/125.12, 125.11, 219/124.34, 125.1

(56) References Cited

U.S. PATENT DOCUMENTS 4,163,886 A * 8/1979 Omae et al. ............ 219/125.11
4,959,523 A * 9/1990 Fihey et al. ............ 219/124.34
6,297,472 B1 * 10/2001 Bong et al. ............ 219/125.12

OTHER PUBLICATIONS

"An Introduction to VME" from the web site www.lecroy.com, no date.*
"VMEbus Frequently Asked Questions (FAQ)" from the web site www.vita.com, no date.*

* cited by examiner

Primary Examiner—Clifford C. Shaw
(74) Attorney, Agent, or Firm—Arent Fox Kintner Plotkin & Kahn (57) ABSTRACT

Disclosed herein is a self-diagnosis type welding carriage control system for automatically controlling welding conditions and implementing an oscillation motion. The welding carriage control system includes a main controller for a database, a remote control panel controller, a welding machine and condition controller, motion controllers for oscillation and travel motions, and a digital signal processing controller for managing memories for the respective controllers. The controllers are each provided internally with a central processing unit, and a dual port random access memory so as to share neighboring central processing units and memories through a versa module eurocard bus.

1 Claim, 8 Drawing Sheets

SELF-DIAGNOSIS TYPE WELDING CARRIAGE CONTROL SYSTEM FOR AUTOMATICALLY CONTROLLING WELDING CONDITIONS AND IMPLEMENTING OSCILLATION MOTION

BACKGROUND OF THE INVENTION

1. Field of the Invention

The present invention relates generally to a self-diagnosis type welding carriage control system for automatically controlling welding conditions and implementing an oscillation motion, and more particularly to a self-diagnosis type welding carriage control system for automatically controlling welding conditions and implementing an oscillation motion, in which a plurality of controllers can be managed in an integrative way, and are each provided with its exclusive central processing unit, thus allowing each of the controllers to have a program and a diagnosis function suitable for the characteristics of the controller.

2. Description of the Prior Art

In general, for marine and ground pipe welding, pipes are directly welded to each other at a welding site. In the case of large-sized pipes, the pipes may be welded to each other while being rotated under a stationary welding torch. However, this conventional method is problematic in that it is difficult to secure a welding torch at a welding site and install equipment for rotating the large-sized pipes.

In order to overcome the above-described problem, there is developed an orbital welding carriage that can weld pipes to each other while rotating around the pipes. However, most of such conventional orbital welding carriages have large sizes and heavy weights greater than 500 kg. Accordingly, the conventional orbital welding carriages are problematic in that they are difficult to move around a work site and have to be moved so as to perform welding at desired welding positions.

Currently, orbital welding carriages, which operators can easily move, have been developed or are being developed, and have been applied to gas metal arc welding, shield metal arc welding and gas tungsten arc welding.

A digital welding carriage control system is advantageous in that it is not affected significantly by poor environment and surrounding temperature and it has various functions of controlling a motor, a welding machine, an oscillation motion and welding conditions stored in a database, and effectively utilizing the system using previously stored programs. A digital welding carriage control system manufactured into a product and disclosed in a patent document is provided with various functions, such as automatic welding condition control, oscillation control and welding machine control, and can successfully carry out real-time control. However, the conventional digital welding carriage control system has a single main controller, so the total control system has to be stopped to handle a breakdown when the main controller is broken down. Additionally, the conventional digital welding carriage control system is disadvantageous in that various welding conditions cannot be satisfied because welding is performed on the basis of previously programmed simple functions, and the complexity of a program is increased because the program of the main controller monitors and controls all functions that are granted to the system.

SUMMARY OF THE INVENTION

Accordingly, the present invention has been made keeping in mind the above problems occurring in the prior art, and an object of the present invention is to provide a self-diagnosis type welding carriage control system for automatically controlling welding conditions and implementing an oscillation motion, in which a plurality of controllers can be managed in an integrative way, and are each provided with its exclusive central processing unit, thus allowing each of the controllers to have a program and a diagnosis function suitable for the characteristics of the controller.

In order to accomplish the above object, the present invention provides a self-diagnosis type welding carriage control system for automatically controlling welding conditions and implementing an oscillation motion, comprising a main controller for a database, a remote control panel controller, a welding machine and condition controller, motion controllers for oscillation and travel motions, and a digital signal processing controller for managing memories for the respective controllers; wherein the controllers are each provided internally with a central processing unit, and a dual port random access memory so as to share neighboring central processing units and memories through a versa module eurocard bus.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
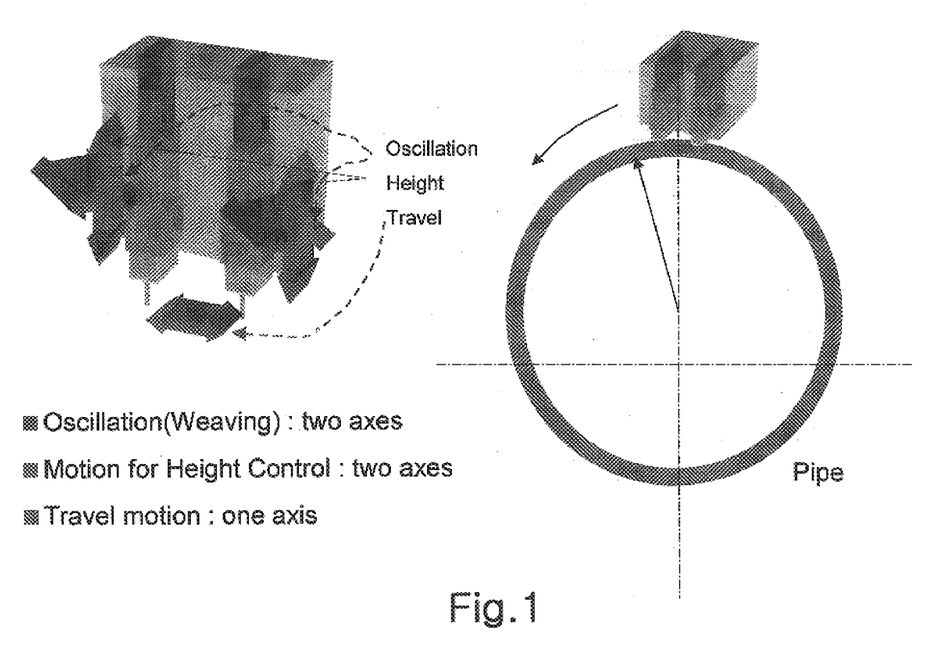
FIG. 1 is a perspective view showing a welding carriage and its motion.

FIG. 1 is a perspective view showing a welding carriage that is equipped with two welding torches. Each of the torches is attached to a mechanical part of a two-axis motion unit. The welding carriage includes a travel axis that can move the two torches in a welding direction.

Figure 2:
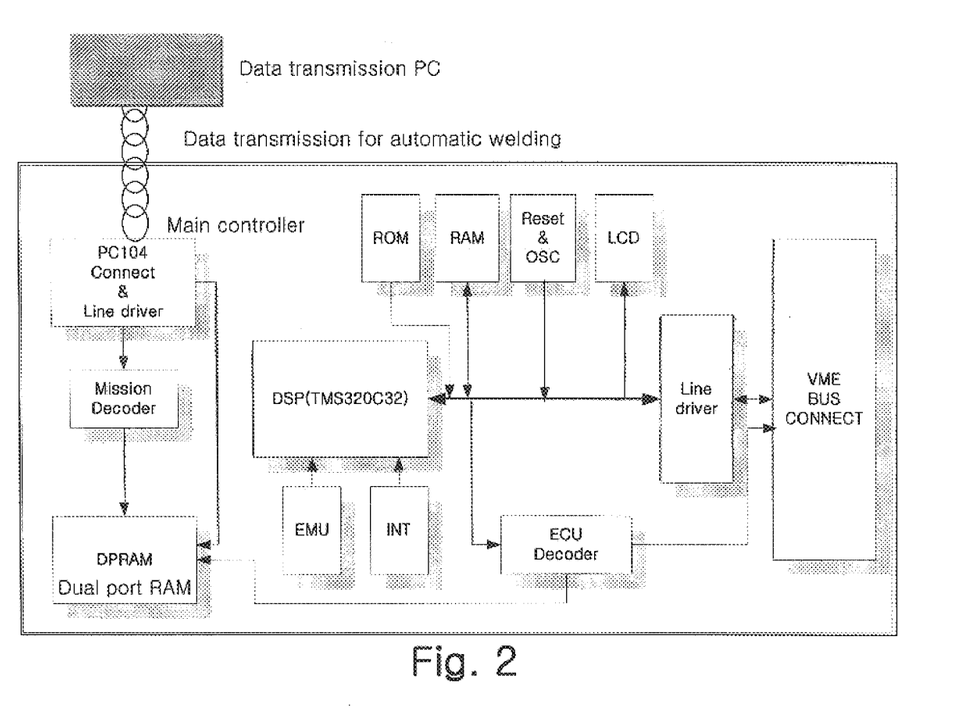
FIG. 2 is a diagram showing a state in which a memory is shared by a database, a main controller and a digital signal processor controller.

FIG. 2 is a diagram showing a state in which a memory is shared by a database, a main controller and a digital signal processor controller. In this case, welding data are transmitted through the main controller to a dual port random access memory, and transmitted data are stored in the dual port random access memory. Data for controlling welding conditions, a welding machine and motions are stored in the dual port random access memory, and the digital signal processor controller transmits all data to dual port random access memories mounted in the other controllers.

Figure 3:
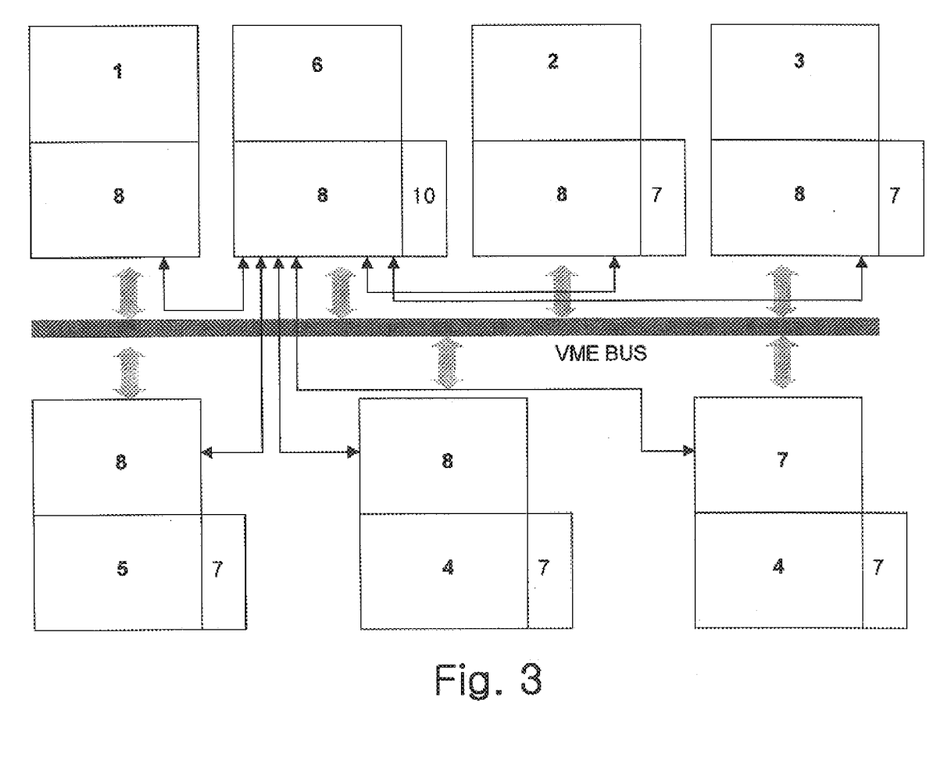
FIG. 3 is a block diagram of a welding carriage control system in accordance with the present invention.
Figure 4:
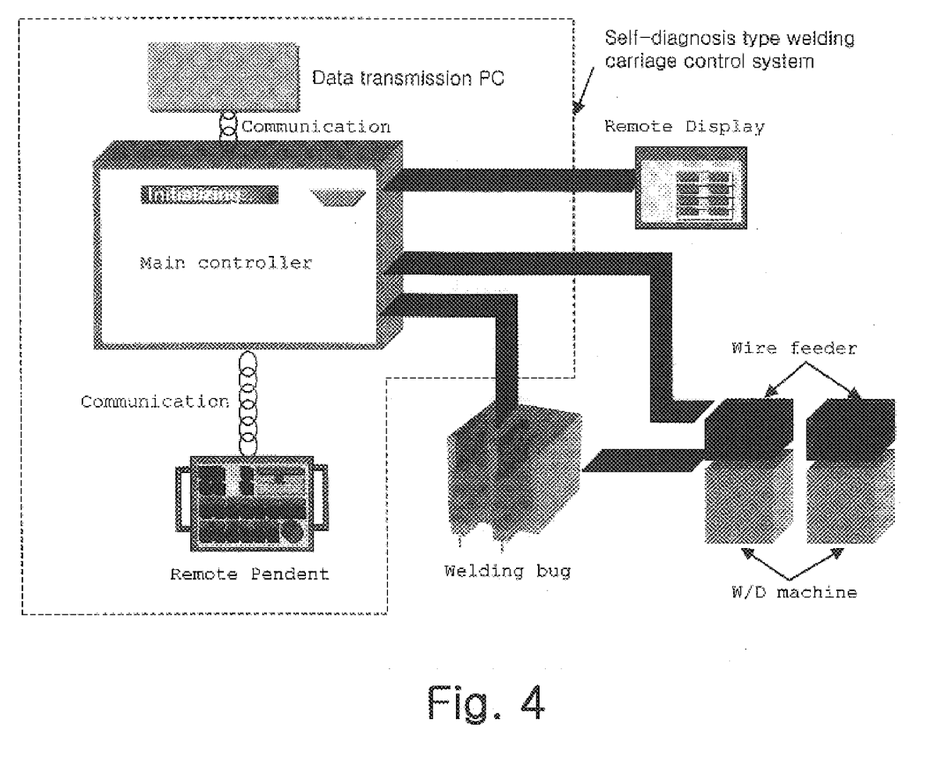
FIG. 4 is a perspective view showing a welding system equipped with the welding carriage control system of the present invention.

FIG. 3 is a diagram showing the construction of a welding carriage control system in accordance with the present invention. The welding carriage control system is comprised of a main controller 1 for a database, a remote control panel controller 2, a welding machine and condition controller 3, motion controllers 4 and 5 for oscillation and travel motions, and a Digital Signal Processing (DSP) controller 6 for managing memories for the respective controllers. The controllers 2, 3, 4 and 5 are each provided internally with a Central Processing Unit (CPU). Additionally, the controllers 1, 2, 3, 4, 5 and 6 are each provided with a dual port Random Access Memory (RAM) 8 so as to share neighboring CPUs 7 and memories through a Versa Module Eurocard (VME) bus 9.

The DSP controller 6 functions to receive all data at one time from the main controller 1 that primarily stores data transmitted to operate the system from a notebook or personal computer, and transmit all the received data to the dual port RAMs 8 mounted in the controllers 1, 2, 3, 4, and 5. When operators desire to change previously programmed data while they are welding pipes, the data can be changed by using various functions implemented in the remote control panel controller 2, and the changed data are transmitted to the DSP controller 6 through the remote control panel controller 2. The transmitted data are stored in unique memory regions of the dual port RAMS, and the DSP controller 6 transmits the changed data to all the dual port RAMs 8 of the controllers. The transmitted values are recognized by the CPUs 7 of the controllers 1, 2, 3, 4, 5 and 6 having independent functions and programs, the previously programmed values are compared with the transmitted values, and there acts a certain function of allowing the changed values to be implemented by operators.

Figure 5:
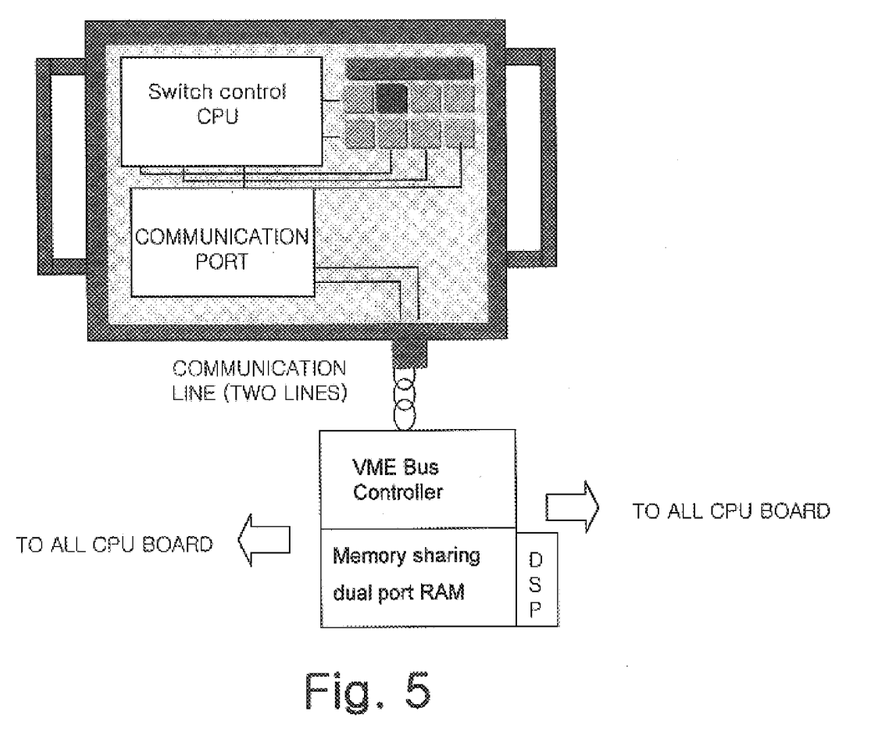
FIG. 5 is a block diagram of a remote control panel controller.

The remote control panel controller 2, as shown in FIG. 5, is comprised of a remote control panel, a CPU, and a communications board. The remote control panel includes a plurality of switches that are used to weld pipes to each other. The CPU serves to determine which switch is selected by checking the manipulation of switches, etc. in real time. The signal generated by a switch is transmitted to the DSP controller 6 through the communications board. The communications board has a differential function, which allows data transmission to a distance of about 2 km. With this function, when pipes are welded to each other on the ground or at sea, the remote control panel is used at a position where a welding operation is carried out, and the remote control panel controller can be handled in a control room remote from the welding site.

The main controller 1 for the database, as illustrated in FIG. 2, serves to receive data that are used to weld pipes and transmitted from an external device. The transmitted data are primarily stored in a hard disk, and restored in the DSP controller and the shared dual port RAM.

Figure 6:
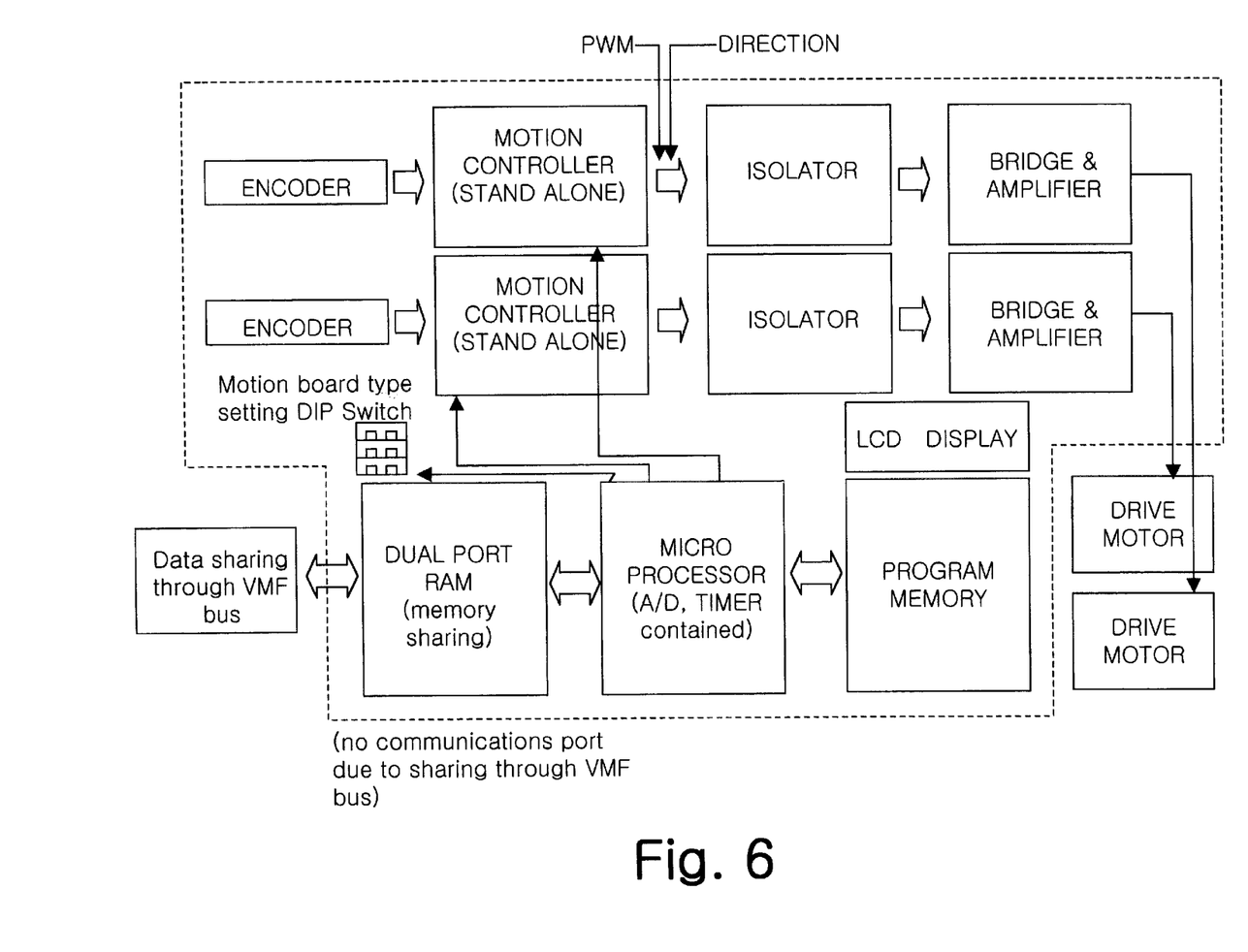
FIG. 6 is a block diagram of a controller for oscillation and travel motions.

A controller for oscillation and travel motions, as shown in FIG. 6, is comprised of motion controllers for oscillation and travel motions, bridge circuits, encoder signal detecting circuits, a CPU, and a Liquid Crystal Display (LCD). The bridge circuits serve to apply driving voltage to drive motors using Pulse Width Modulation (PWM) and motor direction signals generated by the motion controllers. The encoder signal detecting circuits detect encoder signals generated by the rotation of the motors. The CPU transmits motor drive-related variables, the initial values of various motion functions and changed values to the motion controllers in real time. The LCD checks the state of a board by itself, in addition to a self-diagnosis function by the DSP controller.

Figure 7:
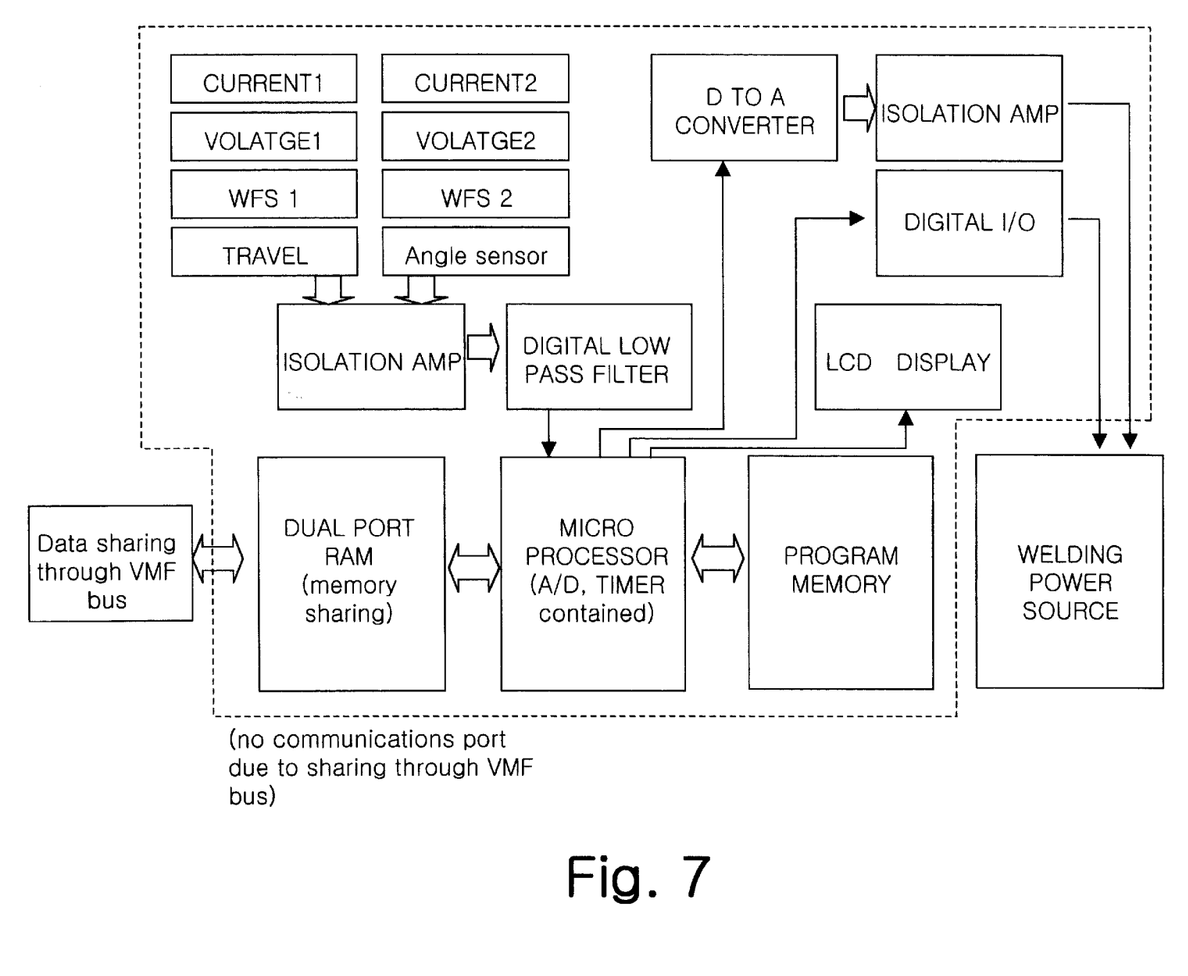
FIG. 7 is a controller for oscillation and travel motions.
Figure 8:
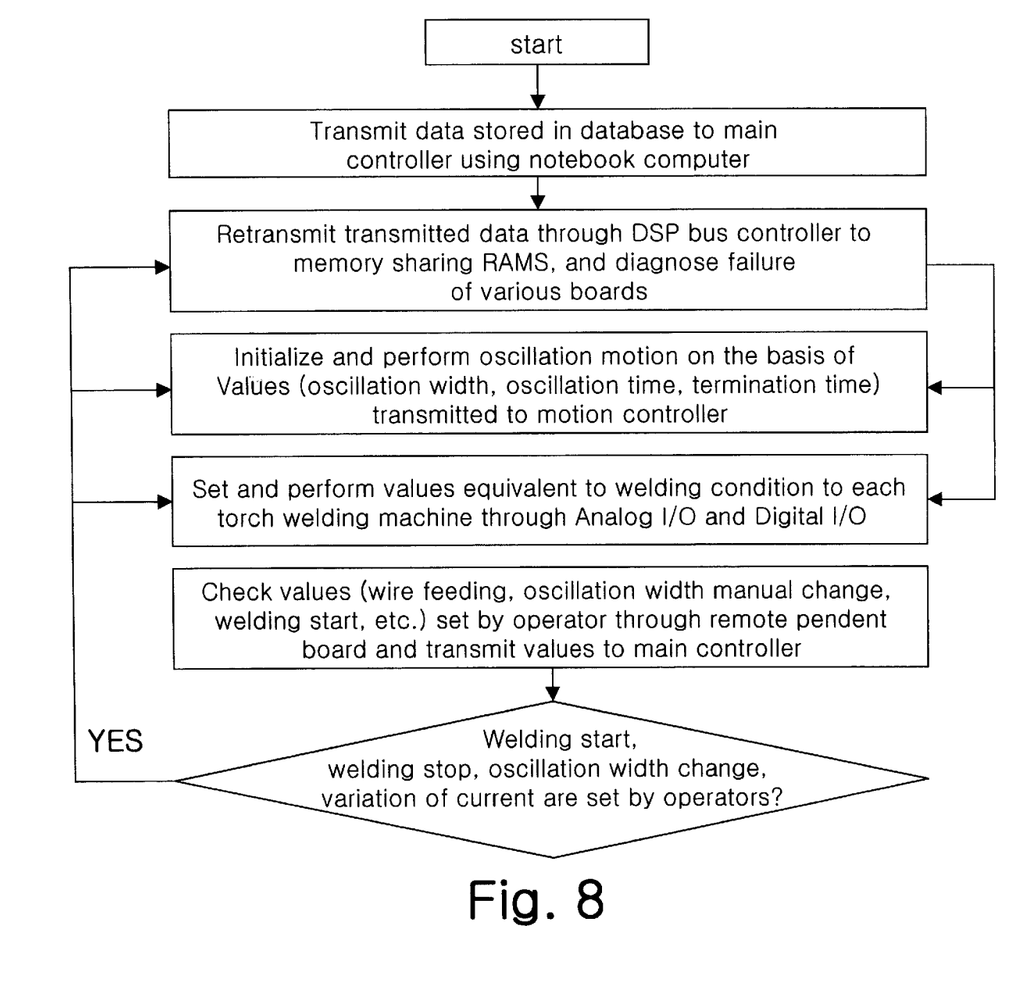
FIG. 8 is a flowchart showing a process of operating the welding carriage control system of the present invention.

The welding machine and condition controller 3, as shown in FIG. 7, has a function of controlling an external welding machine according to welding conditions with respect to angles transmitted from the outside. The welding conditions are defined by welding current/voltage for each welding torch and wire feeding speed in non-pulse mode, or by peak current, base current, pulse width and pulse frequency in pulse mode. In controlling a welding machine, actual welding conditions are feedback controlled to set values on the basis of welding data set described above. The signals are connected through isolation amplifiers to electrically isolate the controllers from external devices. Basic data, which are used to automatically control welding conditions with respect to angles and monitor the quality of welding, are obtained by measuring angles with an angle sensor so as to control welding conditions and measuring welding speed affecting the quality of welding. Measured data are stored in the dual port RAM of a corresponding controller, and the stored data are transmitted to the main controller through the DSP controller. The main controller stores the transmitted data in a hard disk, and apprehends the tendency of welding data using the stored data. FIG. 8 is a flowchart showing a process of automatically controlling welding conditions with respect to angles and a welding machine.

The controllers constructed as described above contain their respective CPUs, so programs may be separately constructed according to the characteristics of the controllers. Accordingly, the complexity of a program in a system comprising a single controller can be avoided, so time required to write a program in the development of a controller can be reduced. Additionally, each controller is equipped with the dual port RAM for the sharing of the CPUs and memories as well as the memory for the storing of a program. For a general RAM, data can be read and written in a single direction; while for a dual port RAM, data can be read and written in two directions. The memory of the dual port RAM can be independently accessed through CPUs positioned on its right and left sides.

The DSP controller manages all the data to share the memories, possesses all data relating to the operation of the machine, such as all welding conditions, detected welding signals, welding modes and signals set on the remote control panel, and transmits the data to the CPUs using the dual port RAMs. The CPUs each access variables for the execution of its unique program using the dual port RAM mounted in its board, and execute the program using the transmitted data.

As described above, the present invention provides the self-diagnosis type welding carriage control system for automatically controlling welding conditions and implementing an oscillation motion, in which each of the controllers is provided with its exclusive CPU and memories are shared, thereby enabling the complicated welding program of the pipe welding system to be easily implemented.

That is, the complexity of a program in a system comprising a single controller can be avoided, so time required to write a program in developing a control system can be reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A self-diagnosis type welding carriage control system for automatically controlling welding conditions and implementing an oscillation motion, comprising a main controller for a database, a remote control panel controller, a welding machine and condition controller, motion controllers for oscillation and travel motions, and a digital signal processing controller for managing memories for the respective controllers;

wherein the controllers are each provided internally with a central processing unit, and a dual port random access memory so as to share neighboring central processing units and memories through a versa module eurocard bus.

* * * * *